United States Patent [19]

Link et al.

[11] Patent Number: 6,090,876
[45] Date of Patent: Jul. 18, 2000

[54] AQUEOUS POLYURETHANE THICKENER COMPOSITIONS HAVING IMPROVED VISCOSITY AND RHEOLOGICAL PROPERTIES

[75] Inventors: Günter Link, Goslar; Dirk Edelmann, Wuppertal, both of Germany; Alain Pattou, Viviers les Montagnes, France

[73] Assignee: Borchers GmbH, Bomlitz, Germany

[21] Appl. No.: 08/954,595

[22] Filed: Oct. 20, 1997

[30] Foreign Application Priority Data

Oct. 29, 1996 [DE] Germany .............. 196 44 933

[51] Int. Cl.$^7$ .................. C08K 5/092; C08L 75/04
[52] U.S. Cl. ................ 524/321; 524/591; 524/839
[58] Field of Search .................. 524/321, 591, 524/839

[56] References Cited

U.S. PATENT DOCUMENTS

| | | | |
|---|---|---|---|
| 3,362,780 | 1/1968 | Kuth et al. | 8/42 |
| 4,079,028 | 3/1978 | Emmons et al. | 260/29.6 NR |
| 4,155,892 | 5/1979 | Emmons et al. | 260/29.2 TN |
| 4,499,233 | 2/1985 | Tetenbaum et al. | 524/591 |
| 5,023,309 | 6/1991 | Kruse et al. | 528/49 |
| 5,378,756 | 1/1995 | Thies et al. | 524/591 |
| 5,550,179 | 8/1996 | Srourian | 524/210 |

FOREIGN PATENT DOCUMENTS

| | | |
|---|---|---|
| 495373 | 7/1992 | European Pat. Off. . |
| 3630319 | 3/1988 | Germany . |
| 1601220 | 10/1981 | United Kingdom . |

*Primary Examiner*—Tae Yoon
*Attorney, Agent, or Firm*—Joseph C. Gil; Thomas W. Roy; Diderico van Eyl

[57] ABSTRACT

The present invention relates to aqueous thickener compositions for adjusting the rheology of aqueous water-dilutable systems which contain
A) a polyurethane thickening agent,
B) a nonionic emulsifier,
C) a compound corresponding to formula (I)

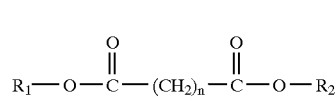

(I)

wherein, independently of one another,
  $R_1$ represents a $C_1$–$C_6$ alkyl group or a $C_4$–$C_6$ cycloalkyl group,
  $R_2$ represents a $C_1$–$C_6$ alkyl group or a $C_4$–$C_6$ cycloalkyl group, and
  n is an integer from 1 to 6, and
D) water and optionally another water-dilutable compound.

The present invention also relates to the use of these aqueous thickening compositions for thickening aqueous resin systems.

13 Claims, No Drawings

AQUEOUS POLYURETHANE THICKENER COMPOSITIONS HAVING IMPROVED VISCOSITY AND RHEOLOGICAL PROPERTIES

BACKGROUND OF THE INVENTION

1. Field of the Invention

The invention relates to thickener compositions and to their use for thickening water-dilutable systems, such as inks, paints and binders, which can be mixed homogeneously or diluted with water.

2. Description of the Prior Art

Thickeners based on polyurethanes and their use for thickening water-dilutable systems are described in numerous publications (e.g. DE-A 1,444,243, 3,630,319 and 4,310,702; EP-A 0,307,775 and 495,373; and U.S. Pat. Nos. 4,079,028, 4,155,892, 4,499,233 and 5,023,309).

A common feature of these thickeners is the simultaneous presence of linear or branched polymers which contain hydrophilic segments (e.g., polyether chains containing at least 5 alkylene oxide units, preferably ethylene oxide units), hydrophobic segments (e.g., hydrocarbon segments containing at least 6 carbon atoms) and urethane groups. These prior art thickeners are suitable for use as component A) according to the invention.

These polyurethane thickeners are suitable for adjusting or modifying the rheological properties of aqueous compositions, e.g., industrial paints, water-based plasters and paints, printing and textile printing inks, pigment printing inks, pharmaceutical and cosmetic aqueous compositions such as creams, plant protection formulations and filler dispersions.

In addition to these polyurethane thickeners, which are also known as "active substances," the prior art thickener compositions may also contain nonionic emulsifiers, additives and water. A disadvantage of these compositions is that in the form of aqueous solutions, they have a high viscosity which makes it difficult to incorporate them into water-dilutable systems.

A number of attempts have been described to reduce the viscosity of thickeners. For example, the molecular weight can be reduced, but this impairs the rheological properties. Various emulsifiers and other additives with emulsifying properties have also been suggested. However, this also impaired the rheological properties.

Another known method for lowering the viscosity is the addition of water-miscible solvents, e.g. monohydric or polyhydric alcohols. However, this usually leads to a deterioration of environmental compatibility and in some cases a deterioration of application properties of the aqueous preparations, such as brushing characteristics or stability.

An object of the present invention is to provide new polyurethane-based thickener compositions for aqueous systems which, in the form of their aqueous solutions, emulsions or dispersions, have a reduced viscosity, but also provide improved rheological properties when compared to prior art compositions.

Surprisingly, this object may be achieved in accordance with the present invention by the addition of certain short-chain esters, which are described in more detail below, as additional additives to the polyurethane-based thickeners.

SUMMARY OF THE INVENTION

The present invention relates to aqueous thickener compositions for adjusting the rheology of aqueous water-dilutable systems which contain A) a polyurethane thickening agent,
B) a nonionic emulsifier,
C) a compound corresponding to formula (I)

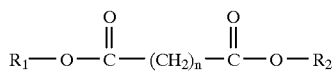

wherein, independently of one another,
$R_1$ represents a $C_1$–$C_6$ alkyl group or a $C_4$–$C_6$ cycloalkyl group,
$R_2$ represents a $C_1$–$C_6$ alkyl group or a $C_4$–$C_6$ cycloalkyl group, and
n is an integer from 1 to 6, and
D) water and optionally another water-dilutable compound.

The present invention also relates to the use of these aqueous thickening compositions for thickening aqueous resin systems.

DETAILED DESCRIPTION OF THE INVENTION

It has been found in accordance with the present invention that the simultaneous addition of components B and C results in a synergistic effect by lowering the viscosity and also improving the rheological properties of the thickener composition. When using an equal concentration of emulsifiers B and additives C, a substantial reduction in the viscosity of the aqueous solutions or dispersions is obtained. In addition, even when the viscosity is comparable, smaller concentrations of emulsifiers B are required in the presence of additives C.

Component C is selected from compounds corresponding to formula (I)

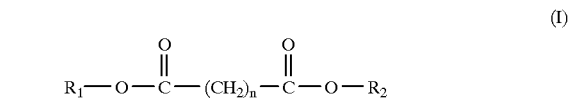

wherein, independently of one another,
$R_1$ represents a $C_1$–$C_6$ alkyl group or a $C_4$–$C_6$ cycloalkyl group, preferably a methyl, ethyl or propyl group,
$R_2$ represents a $C_1$–$C_6$ alkyl group or a $C_4$–$C_6$ cycloalkyl group, preferably a methyl, ethyl or propyl group, and
n is an integer from 1 to 6, preferably from 1 to 4.

Component C also include mixtures of the various compounds corresponding to formula (I).

Component A for use in the compositions according to the invention is selected from known polyurethane thickeners, such as those disclosed in DE-A 4,310,702 (U.S. Pat. No. 5,378,756, herein incorporated by reference), U.S. Pat. No. 4,079,029 (herein incorporated by reference) and WO 8,902,451 (U.S. Pat. No. 5,023,309, herein incorporated by reference). The compositions may also contain mixtures of various polyurethane thickeners. Polymers containing urethane groups, such as those described in Examples 1 and 2 are particularly preferred.

Component B for use in the compositions according to the invention is selected from known emulsifiers, such as those disclosed in the patents previously incorporated by reference. Preferred compounds are those based on polyethylene oxides, e.g., Synperonic (ICI), or those based on polyphenylene oxides, e.g., Borchigen DFN (Borchers GmbH). The compositions according to the invention contain 0 to 40 wt.

%, preferably 10 to 30 wt. %, based on the total weight of the thickener composition, of component B.

Component D is water optionally in admixture with water-dilutable organic compounds, e.g., solvents (such as ethylene glycol or alkoxy alkyl esters), polyethylene oxides or polyethylene glycols. According to the invention, the proportion of the other organic compounds solvents is preferably not more than 10 wt. %, based on the total weight of the thickener composition.

Component A is present in the thickener preparations according to the invention in an amount of 5 to 60 wt. %, preferably 10 to 30 wt. %, based on the total weight of the thickener composition.

Component B is present in the thickener compositions according to the invention in an amount of 0 to 150 wt. %, preferably 50 to 100 wt. %, based on the total weight of the thickener composition. The total quantity of components A and B in the compositions according to the invention is 25 to 90 wt. %, based on the total weight of the thickener composition.

The proportion of component C according to the invention is between 10 and 60 wt. %, preferably 20 to 40 wt. %, based on the total weight of the composition, and 60 to 130 wt. %, based on the total weight of components A and B.

Other additives may be present in addition to the individual components according to the invention. The proportion by weight of these auxiliaries is preferably 0 to 10 wt. %, based on the total weight of the thickener composition.

The preparations according to the invention may be prepared in known manner. For example, components B and C may be added successively, with stirring and optionally with heating, to polyurethane thickener A, which may be dissolved in water. It is also possible to prepare a mixture of components B and C, which is then added to polyurethane thickener A, optionally dissolved in water. The homogeneity of mixtures of B and C should be monitored since these components do not always have unlimited miscibility. One method for improving miscibility is to use solvents or diluents as a portion of component D.

In another embodiment of the invention the thickener compositions according to the invention are prepared by the addition of components B, C and also D to polyurethane thickener A immediately after its synthesis. This method is has economic advantages over the method mentioned above. The compositions according to the invention, when prepared as previously described, are usually aqueous solutions or emulsions, or in some cases dispersions, having a solids content of 10 to 80 wt. %, preferably 20 to 50 wt. %. The term "solid" means the quantity of components A and B, based on the total weight of the thickener compositions.

The viscosity of the compositions according to the invention described above may be measured according to the well known methods. The viscosities within the context of the invention lie within ranges that permit problem-free and favorable processing by pouring, pumping and/or stirring. Measured at 10.3 $s^{-1}$ and at 23° C., it is 500 to 10,000 mPa.s, preferably 800 to 5,000 mPa.s, determined in the Haake rotary viscometer 550 VT.

Due to their low viscosity, the compositions according to the invention may also be used in concentrated form according to the invention. It is an important advantage of the present invention that the thickening effect of the systems is improved rather than impaired in spite of the low viscosity. The application-oriented rheological properties of aqueous binders and paint systems are also markedly improved by the use of the compositions according to the invention.

A further advantage of the present invention is the good compatibility of the thickening compositions with the aqueous systems to be thickened, e.g. latex paints, which enables the thickeners to be incorporated easily. In addition, the so-called maturing period of the resulting thickened compositions, i.e., the time until the maximum possible viscosity is reached, is usually considerably reduced.

The compositions according to the invention are suitable for thickening aqueous or predominantly aqueous systems such as dispersion paints, printing and pigment pastes, filler and pigment dispersions, paper, leather and textile additives, petroleum extraction compositions, detergent compositions, adhesives, waxes, polishes, formulations for pharmaceutical and veterinary purposes, plant protection compositions and cosmetic articles. Water itself may also be partially thickened with the thickeners according to the invention such that further additives may optionally be added thereto, or such that water itself may be added to aqueous compositions.

The compositions according to the invention are suitable not only for thickening purely aqueous systems, but also systems which contain organic solvents or other volatile organic additives, such as alcohols. All the systems which can be thickened according to the invention may also contain the other known additives such as defoamers, flow promoters and flow controllers, fillers and pigments.

Examples of systems which can be thickened according to the invention are aqueous polyacrylate dispersions, aqueous solutions of copolymers of olefinically unsaturated monomers, aqueous polyvinyl acetate dispersions, aqueous polyester dispersions, and, in particular, ready to use compositions of the kind described above based on such dispersions.

When the compositions according to the invention are used to thicken dispersion paints, it results in an often markedly improved flow of these systems and to an improved surface finish of the paint films prepared from these systems. Similarly, an improved wetting of pigments and fillers is often observed as a result of which the dispersion process, i.e., the composition of the ready to use dispersion paints is facilitated. Paint films which were prepared using the dispersion paints thickened according to the invention are frequently characterized by improved gloss.

The invention is further illustrated but is not intended to be limited by the following examples in which all parts and percentages are by weight unless otherwise specified.

EXAMPLE 1

Preparation of thickener composition 630.0 kg of polyethylene glycol with an average molecular weight of 12000 were introduced into a 5,000 liter reactor and stirred for about 2 hours at 100° C. After the moisture content had fallen to below 0.07%, a total of 37.50 kg of a $C_8$–$C_{10}$ fatty alcohol (Sipol $C_8$–$C_{10}$ from Rhône Poulenc, France) and 630.0 kg of a mixture of compounds corresponding to the formula (I) were added at 100° C. After the mixture had cooled to 80° C., 4.70 kg of Octa-Soligen Sn-28 (Borchers GmbH, Monheim) were added slowly as polymerization catalyst. 58.00 kg of Tolonate-HBD-LV (trimeric isocyanate, available from Rhône Poulenc) and 120 kg of the mixture of compounds corresponding to formula (I) ("ROPE" from Rhone-Poulenc, France) were added directly afterwards. The batch was then stirred at 100° C. until the viscosity had been adjusted, and a further 90.00 kg of the mixture and 6.00 kg of a $C_8$–$C_{10}$ fatty alcohol were then added.

This mixture was then reheated to 80° C., and 390 kg of propylene glycol, 390 kg of a $C_8$–$C_{18}$, preferably a $C_{10}$–$C_{13}$, fatty alcohol Synperonic 13/10° (ICI, United Kingdom) as component B and 540 kg of water were added thereto. After the batch had cooled, a further 60.00 kg of a $C_{10}$–$C_{12}$ fatty alcohol Synperonic 12/10° (ICI, United Kingdom) as component B and 60.00 kg of polypropylene glycol 12000 were added.

3,000 kg of a finished thickener composition were obtained. Thickener 1 had a viscosity (10.3 $s^{-1}$, 23° C., Haake VT 550) of 5,000 to 8,000 mPa.s and was an almost colorless clear liquid.

EXAMPLE 2

Preparation of thickener composition 25.0 g of a polyurethane thickener as component A (VP LS 2095 from Bayer AG) were weighed into a 300 ml screw-top glass, and 25.0 g of an emulsifier as component B (Synperonic 13/10°, ICI) were added thereto. In addition, 25.0 g of a mixture of compounds corresponding to formula (I) as component C and 25.0 g of water as component D were added. This batch was heated at 80° C. to form a melt. The batch, while still warm, was then homogenized by intensive stirring and stored for a further 2 to 3 hours at 80° C. until a clear solution was obtained. The resulting viscosity for thickener 2 (10.3 $s^{-1}$, 23° C., Haake rotary viscometer VT 550) was 800 to 2,500 mPa.s.

Comparison Example 1

Example 2 was repeated except that the amount of water was increased to 50 g and component C was omitted.

The resulting viscosity for thickener 3 (10.3 $s^{-1}$, 23° C., Haake rotary viscometer VT 550) was 8,000 to 12,000 mPa.s.

EXAMPLE 3

Measuring the thickening effect 5.0 g of the thickener compositions according to the invention and the comparison thickener were dissolved in each case in 45.0 g of deionized water. 2.0 g of the resulting solutions were then added in each case to 98.0 g of a commercial polyacrylate dispersion (Dilexo® RA3 from Condea, Hamburg), with stirring. Stirring was then continued for 10 minutes with a basket agitator at 1,800 to 2,000 $min^{-1}$. The concentration of the solutions was thus 3.5 wt. %, based on polyurethane thickener A. The mixtures or dispersions were stored for 24 hours at 23° C. and then the viscosity was measured.

The following values were obtained:

| Thickener no. | Viscosity [mPa · s]* (at 23.0° C., 10.3 $s^{-1}$) |
|---|---|
| 1 | 10,000 |
| 2 | 11,000 |
| 3 | 10,000 |

It will be observed that, despite the considerable decrease in the viscosity in the case of thickener 2 and the lower viscosity in the case of thickener 1, the effect as a thickener remains intact. In the comparison between thickeners 2 and 3 (which differ only in terms of the presence of component C according to the invention), it is apparent that despite the substantially lower viscosity, the thickening effect remained the same.

EXAMPLE 4

Evaluation of various application data

An acrylate-based gloss dispersion having the following composition was prepared:

| | |
|---|---|
| AMP 90 (2-amino-2-methyl-propanol, (10% in water) | 1.3 g (Lehmann + Voss) |
| Borchigen ND (25% in water) | 13.6 g (Borchers GmbH, Monheim) |
| Neocryl AP 2860 | 3.2 g (ICI, Runcorn, England) |
| Thickener composition | 9.0 g |
| Titanium dioxide RHD-2 | 112.5 g |
| Methoxypropanol | 8.5 g |
| Propylene glycol | 8.5 g |
| Butyl glycol | 8.5 g |
| Water | 50.0 g |

This mixture was dispersed for 30 minutes in the Skandex with 100 g of 3 mm glass beads. The following were then added:

| | |
|---|---|
| Water | 23.4 g |
| Neocryl XK 62 | 270.0 g (ICI, Resins, England) |

This batch was dispersed, in turn, for 10 minutes in the Skandex. Gloss dispersions were prepared with thickeners 1, 2 and 3 and the following viscosities (10.3 $s^{-1}$, 23° C., Haake rotary viscometer VT 550) were measured:

Gloss dispersion with thickener 1: 30,000 to 32,000 mPa.s
Gloss dispersion with thickener 2: 19,000 to 21,000 mPa.s
Gloss dispersion with thickener 3: 14,000 to 17,000 mPa.s When the non-sag properties were tested (sagging on a vertical surface), the following values were obtained:

Gloss dispersion with thickener 1: No running up to 2.5 mm
Gloss dispersion with thickener 2: No running up to 1.5 mm
Gloss dispersion with thickener 3: No running up to 0.750 mm.

The assessment of the flow properties (flow limit on a horizontal surface) produced the following values:

Gloss dispersion with thickener 1: No running up to 2.0 mm
Gloss dispersion with thickener 2: No running up to 1.25 mm
Gloss dispersion with thickener 3: No running up to 1.00 mm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous thickener composition for adjusting the rheology of aqueous water-dilutable systems which comprises
A) a polyurethane thickening agent,
B) a nonionic emulsifier,
C) a compound corresponding to formula (I)

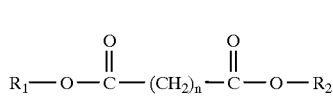

(I)

wherein, independently of one another,
$R_1$ represents a $C_1$–$C_6$ alkyl group or a $C_4$–$C_6$ cycloalkyl group, $R_2$ represents a $C_1$–$C_6$ alkyl group or a $C_4$–$C_6$ cycloalkyl group and n is an integer from 1 to 6, and D) water and optionally another water-dilutable compound.

2. The composition of claim 1 wherein component B is present in an amount of an amount of 15 to 40 wt. %, based on the total weight of the thickener composition.

3. The composition of claim 1 wherein component C is present in an amount of 5 to 70 wt. %, based on the total weight of the thickener composition, provided that the total quantity of components A and B may not exceed 70 wt. % of the thickener composition.

4. The composition of claim 2 wherein component C is present in an amount of 5 to 70 wt. %, based on the total weight of the thickener composition, provided that the total quantity of components A and B may not exceed 70 wt. % of the thickener composition.

5. The composition of claim 1 wherein component C is present in an amount of 10 to 45 wt. %, based on the total weight of the thickener composition, provided that the total quantity of components A and B may not exceed 70 wt. % of the thickener composition.

6. The composition of claim 2 wherein component C is present in an amount of 10 to 45 wt. %, based on the total weight of the thickener composition, provided that the total quantity of components A and B may not exceed 70 wt. % of the thickener composition.

7. The composition of claim 1 wherein component D is present in an amount of 5 to 70 wt. %, based on the total weight of the thickener composition, provided that the total weight of components C and D may not exceed 90 wt. % of the thickener composition.

8. The composition of claim 2 wherein component D is present in an amount of 5 to 70 wt. %, based on the total weight of the thickener composition, provided that the total weight of components C and D may not exceed 90 wt. % of the thickener composition.

9. The composition of claim 3 wherein component D is present in an amount of 5 to 70 wt. %, based on the total weight of the thickener composition, provided that the total weight of components C and D may not exceed 90 wt. % of the thickener composition.

10. The composition of claim 4 wherein component D is present in an amount of 5 to 70 wt. %, based on the total weight of the thickener composition, provided that the total weight of components C and D may not exceed 90 wt. % of the thickener composition.

11. The composition of claim 5 wherein component D is present in an amount of 5 to 70 wt. %, based on the total weight of the thickener composition, provided that the total weight of components C and D may not exceed 90 wt. % of the thickener composition.

12. The composition of claim 6 wherein component D is present in an amount of 5 to 70 wt. %, based on the total weight of the thickener composition, provided that the total weight of components C and D may not exceed 90 wt. % of the thickener composition.

13. A thickened composition containing the aqueous thickener composition of claim 1 and an aqueous system selected from the group consisting of motor vehicle paints, industrial paints, plasters, printing and textile printing inks, pigment printing pastes, pharmaceutical and cosmetic formulations, detergent compositions, adhesives, waxes and polishes.

* * * * *